Feb. 16, 1971 M. W. BEE ET AL 3,564,506

INSTRUCTION RETRY BYTE COUNTER

Filed Jan. 12, 1968 2 Sheets-Sheet 1

INVENTORS
DONALD J. LANG
MARK W. BEE

BY David C. Lovejoy
AGENT

United States Patent Office 3,564,506

Patented Feb. 16, 1971

3,564,506

INSTRUCTION RETRY BYTE COUNTER

Mark W. Bee, Hopewell Junction, and Donald J. Lang, Wappingers Falls, N.Y., assignors to International Business Machines Corporation, Armonk, N.Y., a corporation of New York Filed Jan. 17, 1968, Ser. No. 698,595
Int. Cl. G06f *11/10*
U.S. Cl. 340—172.5 8 Claims

ABSTRACT OF THE DISCLOSURE

Disclosed is a data processing system which upon detection of error during the execution of an instruction retries the instruction. Upon detection of error, the data processing system enters a retry mode of operation and retrys the previously unsuccessfully completed instruction starting with the last successfully completed step as indicated by a counter which counts the number of successfully completed steps. Upon entering the retry mode, the count in the retry counter is used to update the addresses and operand length indicators thereby modifying the retry execution and taking advantage of previously error-free calculations.

CROSS-REFERENCES TO RELATED APPLICATIONS (1) "Instruction Retry Apparatus Including Means for Restoring the Original Contents of Altered Source Operands," by D. L. Schnabel et al., application Ser. No. 697,740, filed Jan. 15, 1968.

(2) "Data Processing Machine Function Indicator," by M. W. Bee et al., application Ser. No. 697,742, filed Jan. 15, 1968.

(3) "Data Processing System Execution Retry Control," by B. L. McGilvary et al., application Ser. No. 697,738, filed Jan. 15, 1968.

BACKGROUND OF THE INVENTION

The invention relates to the field of instruction-controlled digital computers. Instructions cause a computer to operate upon data to carry out a desired data manipulation. A group of instructions form a program. The program normally has its instructions sequentially executed, one at a time, to carry out a complete data manipulation.

Data processing systems generally consist of input/output units (I/O), a central processing unit (CPU), storage units and control units. Data is fed to and from the system through the input/output units and is stored in the storage units. Instructions are executed in the CPU using data fetched from storage or supplied by I/O, all under control of the control unit. In such a system, malfunctions of many types may occur during any phase of the operation. These malfunctions cause undesirable errors in the data manipulation and these errors must be accounted for.

Malfunctions or errors can be classified as either short-lived or long-lived and are designated "transient" (intermittent) or "permanent" (solid, hard), respectively. A transient error may, for example, be the result of a sudden fluctuation in the power supply or the result of a momentary presence of electric or magnetic noise in or near the system. A permanent error may, for example, result from the breakdown of a component such as a transistor or diode. Transient errors which occur frequently enough may, of course, be classified as permanent errors.

This invention is particularly directed to apparatus in a data processing system for overcoming the effects of transient errors and for obtaining a correct data manipulation in spite of the occurrence of transient errors.

A number of prior art techniques have been employed in an attempt to overcome the transient error problem.

One such technique employs the concept of hardware redundancy, that is, using two or more computer systems or subsystems to simultaneously perform the same data manipulation. For example, two completely different computer systems can be programed to carry out the same calculations and, if one of the two systems fails, there is a high probability that the other one did not. The data result obtained from the non-failing system, of course, is then used. While this redundancy concept can be employed on a systems level, it can be also employed on a subsystem level, as for example, where duplicate central processing units share the same input/output, storage, and control units. Although this redundancy approach may sometimes be desirable, the cost of duplicating systems or subsystems is prohibitive and normally not justifiable.

Another approach to the problem of transient errors is to stop processing completely upon detection of an error and restart over again from the beginning. This restarting is accomplished by checking the integrity of data and reloading the program with an initial program load (IPL). This operation can be characterized as a restart on error at the IPL level. Since it may take considerable time to reload the computer and since all of the operating time that was invested prior to the error is wasted, this approach of retry by restart at IPL makes an inefficient use of computer time.

Another method employed for overcoming the transient error problem has been carried out using the programed retry technique called "check pointing." Using this approach, every program must be written to incorporate retry provisions which include insertion of checkpoints within a computer program and instructions for saving all system data and control information at each checkpoint until the next checkpoint is reached. When an error occurs, the system is returned under program control, to its condition at the last checkpoint. The data and control information which were saved at the last checkpoint are employed to restore the system. After restoration, the operation is restarted. If the transient error does not reappear, of course, normal instruction execution proceeds. Although this programed retry technique works well in some environments, it has a tendency to degrade system performance and use additional system resources because of the time required to store away information at checkpoint time even when no errors are occurring. Additionally, programed retry has the fault of requiring a programer to incorporate the retry provisions in most programs.

Another approach to the transient error problem is embodied in the hardware retry technique disclosed by Montgomery in U.S. Pat. 3,248,697. In the Montgomery system, error detection circuits monitor the execution of the instruction. Each instruction has a threshold point after which execution may not be retryed because, during the partial instruction execution, source data upon which execution is dependent has been modified so that it is no longer available for retry. More succinctly, retry is impossible after source data is changed. If the error occurs before the threshold has been reached for the particular instruction, the machine is immediately stopped and a retry of that instruction is carried out. This hardware retry is transparent to the program in that no program instructions are necessary to carry out the retry. However, if the threshold has been passed for the particular instruction, no retry is possible. While the Montgomery hardware retry technique is significant in that no system degradation occurs absent an error, it has the fault that after the threshold has been passed the instruction cannot be retryed and a time wasting program reload or checkpointing technique must be resorted to with the attendant disadvantages as discussed above.

SUMMARY OF THE INVENTION

In light of the problems attendant prior art data processing systems, the present invention is an apparatus which overcomes the problems of transient errors by implementing instruction retry at any time that an error occurs during the execution of an instruction. The present invention specifically includes the capability of retrying instructions, upon error detection, from the point of last successful completion. Accordingly, the present invention achieves an economy of retry time in that prior successful execution steps do not need to be repeated, and additionally eliminates the need for a large backup store which would otherwise be necessary to retry instruction involving long operands.

More particularly, the present invention is a retry apparatus for use in data processing systems which employ storage-to-storage (SS) instructions SS instructions are defined as instructions which fetch one or more operands from storage to the central processing unit, manipulate the operand or operands to form a result, and store that result in the field of storage originally occupied by one of the initial operands. Since the results are placed in the field of the original operand, storage of results after a number of processing cycles would destroy the original operand data and normally make retry impossible. The apparatus of the present invention records the number of error-free result stores and upon detection of error resumes processing at the next step after the previous successful completion.

When an error is detected by the normal error detection circuitry of the data processing system, the system control unit inhibits further processing, restores the instruction address of the instruction to be retried into the instruction address register and performs other "housecleaning" operations. With the address of the instructions to be retryed restored, the normal instruction fetch (I-fetch) routines are carried out as in normal processing up until a point where the source operands are to be addressed for processing. Since those source operands may have been changed, a source data change (SDC) trigger is interrogated. If the SDC trigger has been set indicating that at least one source operand was overwritten during a prior erroneous attempt at instruction execution, the successful completion count is used to update the address and control values so that processing begins just prior to the point where an error was detected. If during the next or subsequent attempts at execution another error occurs, further processing is again inhibited, I-fetch is repeated, and after updating, processing begins at the point of last successful completion.

Any number, N, of retry attempts may be carried out. If after the Nth unsuccessful retry, processing of the instruction has not been completed, no further retry is attempted. If the error is transient, however, one or more retry attempts will usually enable error-free execution to be achieved. If the latter occurs, normal processing is resumed.

It is apparent from the above summary of the invention that a hardware apparatus is provided which achieves the objective of instruction retry on error where the retry is transparent to the program, causes no degradation of system performance absent the occurrence of an error, and is carried out even where source data has been changed. Additionally, the present invention requires a minimum of backup circuitry even for long operands.

The foregoing and other objectives, features and advantages of the invention will be apparent from the following more particular description of the preferred embodiments of the invention as illustrated in the accompanying drawings.

BASIC ENVIRONMENTAL SYSTEM

The present invention is for use in a data processing system typically including storage, a central processing unit (CPU), a system control unit and some form of input/output (I/O) unit. Such a system is described in the following references:

(1) U.S. patent application entitled, "Improved Program Suspension System," by Matthew A. Krygowski and Thomas S. Stafford, Ser. No. 573,246, filed Aug. 18, 1966, and having the same assignee as the present invention.

(2) "IBM System/360 Principles of Operation," Systems Reference Library, Form A22–6821.

(3) "System/360 Model 50, Comprehensive Introduction," IBM Field Engineering Manual of Instruction, Form 223–2825.

(4) "System/360 Model 50, RS, SI, SS Instructions," IBM Field Engineering Manual of Instruction, Form 223–2825.

(5) "Microprogramming Manual for the IBM System/360 Model 50" by S.S. Husson, Oct. 2, 1967, Technical Report TR 00·1479–1, IBM Systems Development Division, Poughkeepsie, N.Y.

The details of the basic environmental system as disclosed in the above references are hereby incorporated by reference in this specification for the purpose of teaching the operation of a basic environmental system. Additional attention will be directed to those references hereinafter where appropriate to further identify details helpful in understanding the system operation.

Figures 1, 3:
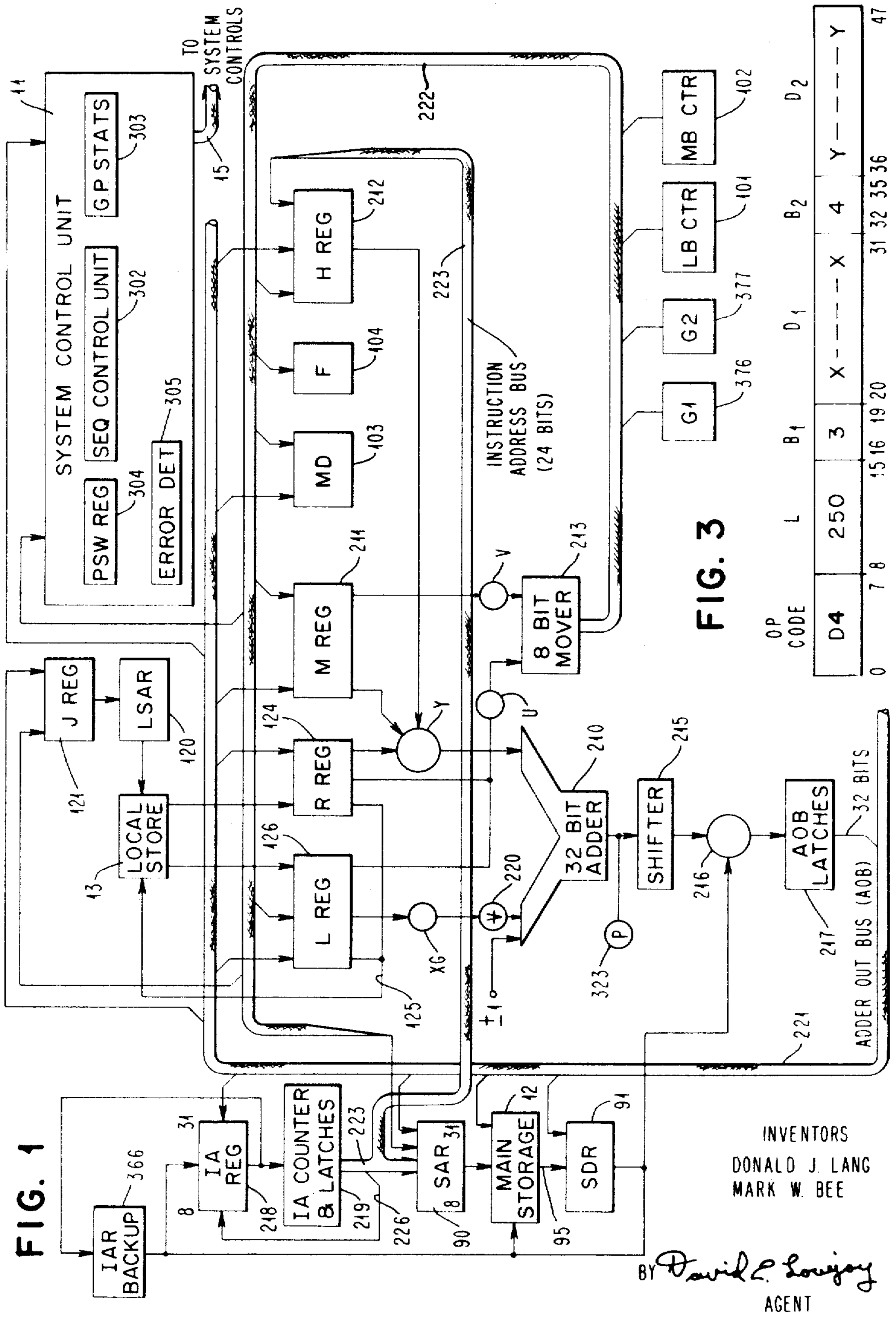
FIG. 1 depicts the system configuration of the present invention as implemented in a basic environmental system.
FIG. 3 depicts an exemplary VFL COMPARE instruction using the SS format.

With reference to FIG. 1, the system storage includes main storage (MS) 12 and local storage (LS) 13. Although no special input/output units are shown, such units are well-known and communicate with the FIG. 1 system through the gating network 216 into the AOB LATCHES 217 onto the adder output bus (AOB) 221. The system control unit 11 controls the system operation by opening and closing gates and establishing other control signals at extensive locations throughout the system. Since such gating and control signals and their implementation are well-known, they are collectively represented by the output bus 15. Specific control signals important to the present invention will be discussed further hereinafter. The remainder of the circuitry shown in FIG. 1 is generally considered part of the CPU. The CPU and the system have the capability of executing store-in-place instructions.

Main store

The main storage (MS) 12 may be physically integrated with the CPU or constructed as a stand-alone unit. The storage cycle speed is not directly related to the internal cycling of the CPU, thereby permitting an efficient relationship of CPU speed to storage width. Fetching and storage of data by the CPU are not affected by any concurrent I/O data transfer.

The main store 12 is preferably a matrix array of magnetic cores where a given address in the array is selected by signals in the storage address register (SAR) 90. When the SAR 90 contains a main store address, the main store 12, under its own internal timing controls, operates through its basic memory cycle to read information onto output sense lines 95 into the storage data register (SDR) 91. From SDR 91, data may be regenerated back into MS 12 and to the gating circuitry 216, the AOB LATCHES 217, onto the adder output bus (AOB) 221.

The basic memory cycle includes a read half cycle in which data is destructively read out from main storage into the SDR followed by a write half cycle in which the information in the SDR is regenerated back into main storage. By placing different information into the SDR 91 prior to regeneration on the write cycle, the information that was in main storage is effectively changed. Simultaneously with the regeneration cycle, the information in the SDR 91 becomes available to the system on the AOB 221. For further details as to the timing, control, and general operation of MS 12 reference should be made to the above-identified Krygowski et al. application.

The information format of the environmental system organizes eight bits into a basic building block called a "byte." Each byte also includes a ninth bit for parity used in error detection. The parity bit cannot be effected by the program, its only purpose being to cause an interruption when a parity error occurs. Although express mention of the ninth bit in each byte will generally not be made throughout this specification, it is assumed that the parity bit will be associated with bytes and that the normal parity checking circuitry is included throughout the system in the well-known manner.

Two bytes are organized into a larger field defined as a half-word, and four bytes or two half-words are organized into a still larger field called a word. More specifically, a "word" is defined as four consecutive bytes in the environmental system and will be treated as such in this invention. However, it will be understood that words or bytes can equal any number of bits.

Various data formats may be employed in the environmental system so that instructions and operands may be of different lengths depending upon the particular operation which is to be carried out.

Bytes are assigned locations in storage in consecutively numbered positions starting with zero. Each number is considered the address of the corresponding byte. A group of bytes in storage is addressed by the leftmost byte of the group. The number of bytes in the group is either implied or explicitly defined by the operation specified by the instruction. The addressing arrangement uses a 24-bit binary address to accommodate a maximum of 16, 777, 216 byte addresses. This set of main storage addresses includes some locations reserved for special purposes.

Storage addressing wraps around from the maximum byte address to the zero address. Variable-length operands may be located partially in the last and partially in the first location of storage, and are processed without any special indication of crossing the maximum address boundary.

Fixed-length fields, such as half-words and double-words, must be located in main storage on an integral boundary for that unit of information.

A boundary is called integral for a unit of information when its storage address is a multiple of the length of the unit in bytes. For example, words (4 bytes) must be located in storage so that their address is a multiple of the number 4. Variable-length fields are not limited to integral boundaries, and may start on any byte location.

Local store

Local store (LS) 13 consists of 64 one word capacity registers which are addressed by the local store address register (LSAR) 120. The LSAR 120 is loaded from the J register (J REG) 121 which is in turn fed from the AOB 221 or the moved out but (MOB) 222. Whenever a read operation is specified from LS 13, the addressed word in LS 13 is read out either to the L register (L REG) 126 or to the R register (R REG) 124. The L and R registers have their outputs gated either back to the LS 13 or to the adder 210.

Local store 13 has a READ and WRITE operation similar to that of the main store 12 and the specific details of operation will be found in the above-mentioned Krygowski et al. application.

Sixteen of the 64 one word locations in LS 13 are designated as general registers which are used as index registers in address arithmetic and indexing, and used as accumulators in fixed-point arithmetic and logical operations. These general registers are identified by numbers 0–15 and are specified by a 4-bit field in instructions. Additionally, LS 13 includes working store (WS) locations which are used for various purposes throughout processing.

Central processing unit (CPU)

There are three basic data-bus lines that are different in width, and through which data is channeled from one register to another. These are the 32-bit adder-out bus (AOB) 221, the 24-bit instruction-address bus (IAB) 223, and the 8-bit mover-out bus (MOB) 222.

The basic environmental system data flow consists primarily of two parallel paths which may be activated simultaneously. One is the 32-bit wide adder path including the adder 210 which is fed by the several 32-bit registers L, R, M and H. The other path is the 8-bit wide logical mover path including the 8-bit mover 213 fed by the L, R and M registers. The mover manipulates one-byte blocks in half-byte increments.

In addition to the adder and mover data paths, four other data paths are of interest in describing the basic environmental system. Mainly, the shifter, instruction address, local storage, and main storage data paths.

The adder is capable of performing both binary and decimal arithmetic. Decimal arithmetic is performed by doing a binary add (true or complement) and generating a decimal correction factor into the L register in the same CPU cycle. Another cycle is needed to subtract the correction factor from the results of the preceding cycle. The adder 210 includes, besides 32 individual adder units, four parity checking circuits (one for each byte), four parity generating circuits (one for each byte), as well as carry look-ahead circuitry. When performing arithmetic functions, data is gated to the right-adder input Y from the 32-bit register H, M, or R. The left adder input XG contains a true/complement gate 220 and is fed by the 32-bit register 126.

In a single CPU cycle, two 32-bit operands are gated one each into the XG and Y adder inputs, passed through the adder and continue on to set the adder output latches 217. At the end of the CPU cycle, the adder output is in the latches 217 ready to be gated out into an operating register. In the basic environmental system, subtraction is achieved by use of the two's complement which is controlled by the true/complement gate 220 on the XG input. When the complement gate is set, bits gated into XG will be inverted (i.e., one's become zeros and zeros becomes ones), thus forming the one's complement of the original XG input. The two's complement is achieved by inserting a carry into the XG adder input. Multiplication and division are accomplished using the adder by taking successive additions and subtractions. The various gating and control signals necessary to carry out the adder functions described emanate from the system control unit 11 which will be described in more detail hereinafter.

The shifter data path runs from the adder 210 to the AOB latches 217 and enables the adder output to be shifted to the left or the right either one or four places. Additionally, the shifter 215 includes means not shown for saving and storing the overflow portions of any shifted data. Again, the shifter is controlled by the system control unit 11.

The mover data path is used primarily for the execution of variable-field-length (VFL) instructions. Two byte sources may be selected simultaneously for a logical operation by the mover. The left-mover input, U, may be a byte selected from the L register under the control of one of the two byte counters LB 101 and MB 102, a byte formed by the contents of the two four-bit registers MD 103 and F 104. The right mover input, V is a byte selected from the M register 211 under control of either byte counter LB or MB. The mover like the other data paths is controlled by the system control unit 11.

The instruction address data path is 24 bits wide for moving and updating the 24-bit instruction address contained in the instruction address register 218. The first instruction address is initially set in the instruction address register (IAR) by the system control unit 11. Instruction addresses are gated from the IAR 218 to the instruction address counter and latches 219. The instruction address counter increments the instruction address by the appropriate number of bytes (6 bytes in the case of restore in place or SS instructions) and places that updated address in the IAR via the bus 226. The current instruction address before updating, represents the location in the main store 12 of the current instruction to be executed and it is read into the storage address register (SAR) 90, gated to the main storage 12, and causes the addressed instruction to be read out into the storage data register (SDR) 91. Instruction read out from main store 12 into the SDR pass through the gating circuitry 216 to the AOB latches 217. The sequence of gating out an instruction is called I-fetch and is broken down into first and second level I-fetch. During I-fetch, the instruction is read out and is used to set up the CPU and local store with various initial conditions prior to commencement of execution.

The main storage and local storage data paths were previously discussed in connection with the above sub-headings Main Storage and Local Storage.

System control unit

The system control unit 11 includes a sequence control unit 302, general purpose stats 303, a program status word (PSW) register 304, and error detection circuitry 305.

Figure 2:
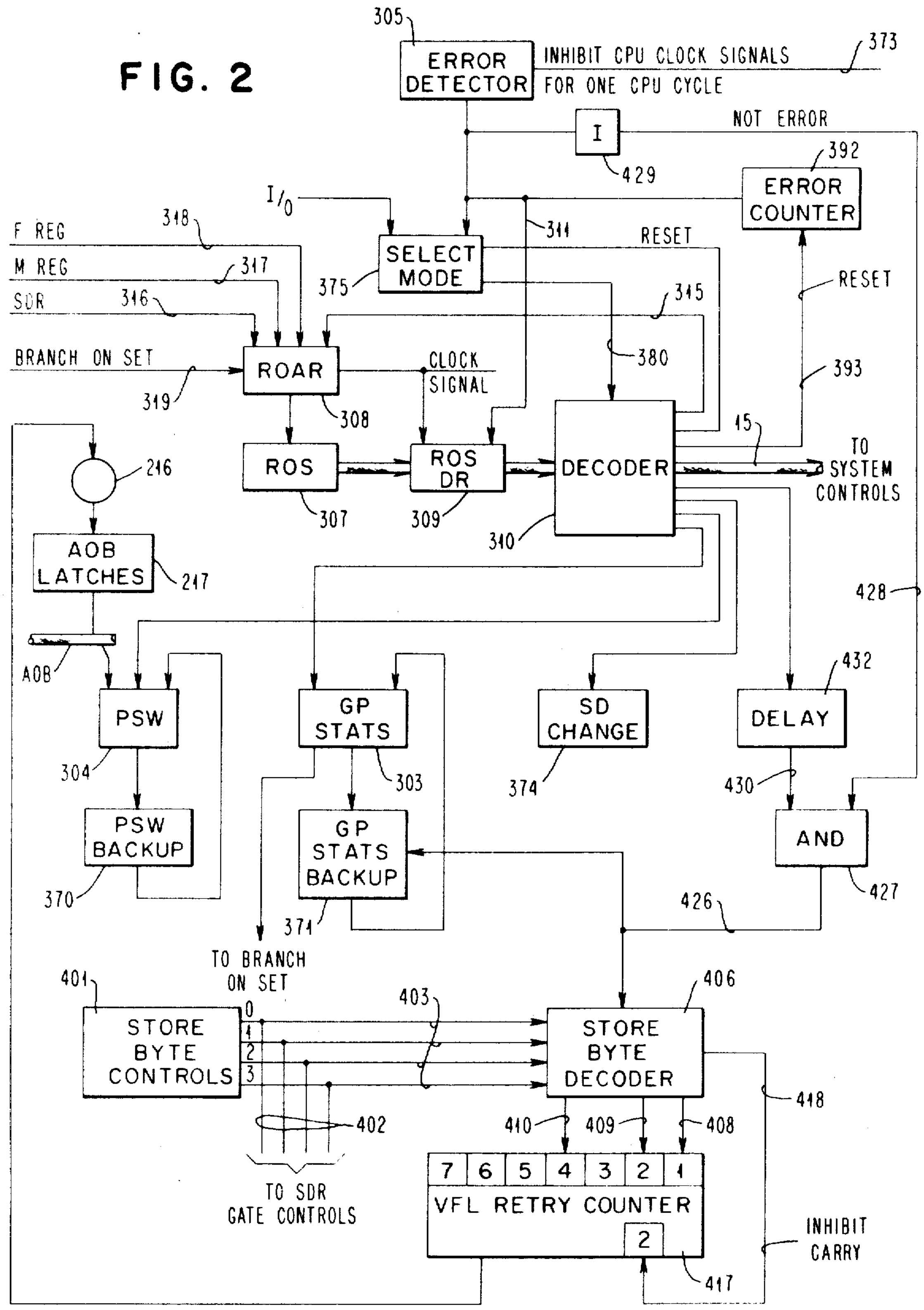
FIG. 2 depicts the system control unit 11 in FIG. 1 in greater detail and includes the retry counter which records the number of successful completions of steps in an instruction.

Further details of the environmental system control unit 11 are shown in FIG. 2 along with circuitry added for the purposes of the present invention. The sequential control unit 302 basically includes a read only store (ROS) 307 which is addressed by a read only store address register (ROAR) 308. Upon selection of an appropriate address by ROAR 308, ROS 307 reads out a control word into the read only storage data register (ROSDR) 309. The control word set in ROSDR 309 controls the action of the processor for one machine cycle, a new control word being read out prior to each new CPU cycle. The control words in ROSDR are gated through the decoding circuitry 310 to the various gates and control circuits of the system via bus 15. For example, bus 15 connects to gates (not shown) on all of the L, R, M, and H registers and controls the gating of data in and out of those registers. Similarly, virtually all of the units shown in FIG. 1 include such gating facilities although they have not been shown in order to make the drawings clear. Words are organized in ROS 307 in microword sequences where the next word in the sequence is partially determined by the previous word via a portion which is returned to ROAR 308 from the decoder 310 via the return bus 315. A sequence of ROS words sets up the necessary controls for many cycles of CPU operation thereby allowing the CPU to carry out many varied data manipulations. In addition to the input from the decoder 310, the particular sequence is partially selected by inputs from the SDR 91, the M register and the F register via lines 316, 317 and 318, respectively. Additionally, as an aid to selecting a different ROS routine or control word as a function of some machine condition or data value, the ROAR 308 has a branch-on-set input 319 which controls whether or not to branch to a specified ROS address as a function of whether or not a general purpose stat condition code in PSW, or other settable control has been set. The general purpose stats 303 or other settable controls can be set by the decoder 310 or by other inputs within the data processing system.

The program status word register 304 includes status and control information used in carrying out the various control functions of the system and is used to record the current status of the system. The PSW 304 can be set from the AOB 221.

The error detection circuitry 305 comprises the normal parity checking circuitry as indicated, for example, by the parity check 323 on the output of the adder 210, in FIG. 1. Parity checking circuits appear throughout the FIG. 1 system and all feed the error detecting circuitry 305 in any well-known manner.

OPERATION OF BASIC ENVIRONMENTAL SYSTEM

The operation of the basic environmental system is controlled by instructions. The instructions are fetched from main storage to the SDR under control of the instruction address register. The type of operation to be carried out is determined in part by the particular format of the instructions to be used. Although five basic instruction formats are possible, the SS format will be discussed, by way of example, in this specification. For the purpose of describing the execution of instructions, operands are designated as first and second operands with a "1" being used to identify information associated with the first and "2" being used to designate the second. As shown in FIG. 3, bits 0–7 contain the OP code; bits 8–15, the operand 1 and operand 2 byte length, L; bits 16–19, the operand 1 base address, B1; bits 20–31 the operand 1 displacement, D1; and bits 32–47, the operand 2 base address, B2, and displacement D2, as indicated.

For addressing purposes, the B field of the SS instruction specifies the contents of one of 16 general purpose registers in the local store. The contents of that register is a 24-bit number which when added to the D field equals the leftmost byte address in main storage of the respective operand. More particularly, the number in the general purpose register specified by B1 plus D1 specifies in binary notation the main storage address of operand 1. The L field specifies the number of bytes from that leftmost byte in main store which operand 1 extends to.

Normally, the operation of the processing unit is controlled by instructions taken in sequence. The process of fetching instructions is called I-fetch and is broken down into first and second levels during which various counters and registers are set with the apporpriate fields derived from the instructions.

A particular example of an SS instruction for a VFL operation is shown in FIG. 3. More particularly, the OP code is D4 which specifies a VFL (variable field length) AND type operation. L is 250 indicating that both the first and second operands are L plus 1 bytes in length, that is, 251 bytes. B1 is set to three indicating that the base address for operand 1 appears in the local storage general purpose register 3. The general purpose register 3 will contain, as loaded during the initial program loading, a 24-bit base address which when added to the D1 displacement field of the FIG. 3 instruction will equal the main storage address of the leftmost byte of operand 1. In the example to be given, B1 plus D1 totals 1049. Similarly, the contents of general purpose register 4 plus the displacement D2 equals the main storage address of the leftmost byte of operand 2 which in the example to be given equals 1113.

The first operand address as calculated from B1 and D1 is kept for the current word in WS1 (location in the local store 13) or the H register and the two low-order bits are maintained in the MB counter. The second operand address, as calculated from B2 and D2, is kept for the current word in WS2 or the R register and the two low-order bits are maintained in the LB counter. The addresses for each word are updated as processing progresses.

The operand fields are variable byte length up to 256 bytes. Fetching is a word at a time, processing being from left to right. When a new word is needed, the address of the current word is gated to the Y adder input and four is emitted to XG adder input. The sum is used to address main storage and is also gated back to update the current word address. Result bytes are assembled in the M register and are stored at the current result word address location in main storage when a word boundary (MB counter equals 3) is encountered or when the operation is ended (G1–G2=0, the G1–G2 counter being used to store the number of the bytes remaining to be processed). The current destination address (address to which the result of manipulating operand 1 and operand 2 will be sent) is used to access main storage. Since it may not be necessary to modify all four bytes at that specific word location, the VFL instructions store with a special micro-order that allows only certain bytes of SDR to be modified. Byte selection is made in conjunction with the byte store stats (one for each byte in SDR). The stats are contained in the store byte controls 401 of FIG. 2. The byte store stats are set from the MB counter when a destination byte is assembled through the mover 213 into the M register (see FIG. 1).

By way of example, the AND (VFL) instruction having the Op code D4 will be used. Operand 1 is AND'ed with operand 2 and the result is stored in the operand 1 location thus changing source operands. The operands do not have to start or end on a word boundary nor do they have to be byte-aligned to one another. Both fields are treated as binary quantities. The AND (VFL) operation can be broken down into 4 phases as follows:

(1) Fetch the second operand to the L register,
(2) Fetch the first operand to the M register.
(3) Gate operands 1 and 2 to the mover under control of LB and MB counters, respectively, and gate the result to the M register under control of the MB counter.
(4) Gate the result from the M register to the SDR and store the result in main storage in the operand 1 field.

As each byte is gated to the mover, the G1–G2 counter is decremented. The G1–G2 counter indicates the number of bytes remaining to be processed and the counter is tested for zero to signal the end of processing.

Detailed description of the present invention

The present invention is directed to retry apparatus which is added to a data processing system such as the above described basic environmental system. The retry apparatus allows such a system to overcome the effects of transient errors and allows a correct instruction retry. The retry is in a shortened form, however, taking advantage of all successful execution prior to the occurrence of the error. The shortened retry is achieved by recording the number of correctly stored result bytes when executing an instruction a byte at a time. By starting the retry execution with the byte after the last successfully executed byte, the need for a large backup store is eliminated. For example, in the present embodiment using operands of 256 bytes, the need for a 256 byte backup store is eliminated.

With reference to FIG. 2, the additional controls are shown which count the number of successfully completed bytes in the byte at a time processing of the relatively long operands. By way of review, results are stored in main storage, after being gated from the M register, through the adder 210, to the AOB 221, and finally to the SDR 91. From the SDR, the bytes are stored into main storage 12 during a regeneration cycle. The four stats in the store byte controls 401 of FIG. 2 control how many of the four bytes (0, 1, 2, 3) will actually be stored. The four stats in controls 401 have outputs which normally go in the basic environmental system to the SDR gate controls via lines 402. Since operands can begin or end on other than on a word boundary, any combination of adjacent bytes may be stored during any STORE cycle. The number of successfully stored bytes during a word STORE cycle is detected by the STORE byte decoder 406 via input lines 403 from the store byte controls 401. The store byte decoder changes the store byte controls output to a binary representation of the number of bytes stored. If the number of bytes stored is a binary one, two, or four, a signal is passed directly from the store byte decoder to the VFL retry counter 417. That is, for a one, a signal is passed over line 408 to advance the one position of the VFL counter 417. In a similar manner, a two byte store produces a signal over line 409 to up the two's position of the counter 417. For a four byte store, a signal is presented over the line 410, to up the four position of the VFL counter. In the case where three bytes have been successfully stored, no direct insert into the VFL binary counter 417 is possible. However, in the case of a three byte STORE, signals are presented on both lines 408 and 409 with an additional inhibit signal on line 418 to inhibit any possible carry from the counter 1 position to the two position.

Before the store byte decoder 406 will update the VFL retry counter 417, however, it must receive a signal via line 426 from the AND 427. AND 427 is satisfied by a NOT ERROR signal on line 428, which, in the embodiment shown, is merely the inverted (via inverter 429) error signal from error detector 305. The other input 430 which together with the input 428 satisfies AND 427 is produced by the decoder 310, which signal from decoder 310 is also used to energize the store byte control 401. It is necessary to delay via delay 432, the store byte control signals in order to assure that the error detector 305 has had sufficient time to detect an error and turn off the signal carried via line 428 to AND 427, thereby preventing the store byte decoder 406 from advancing the VFL counter 417. The important point to be realized is that the VFL retry counter 417 counts only the number of successfully stored bytes. When an error does occur, the AND 427 becomes dissatisfied, and inhibits via line 426 store byte decoder 406 and thereby prevents any advance of the VFL retry counter 417.

Besides the retry counter 417, the system includes the instruction address register backup 366 as shown in FIG. 1. The IAR backup register 366 merely holds the instruction address which is being executed until it is ascertained that the execution was error free, that is, no error detected. The instruction address register 218, as described above, is updated during normal processing before execution completion and, therefore, does not contain the current instruction address. For that reason, I-fetch cannot be returned to without aid of the backup register 366 or some other means of reloading the instruction address register prior to retry. Whe nthe system control unit 11 is operating in the retry mode, the sequential control unit 302 gates the backup register 366 into the instruction address register 218 at the appropriate time before I-fetch.

With reference to FIG. 2, additional backup circuitry is shown for parts of the control unit circuitry which are changed during the normal execution of an instruction or upon detection of an error. More particularly, the PSW register 304 includes a backup register 370 for restoring the condition code bits in the program status word. The general purpose stats 303 include backup stats 371 which are used to restore the general purpose stats when the system control unit branches on detection of an error to the retry mode of operation. Additionally, the error detection circuitry 305 gives an inhibit CPU clock signal for one CPU cycle when an error has been detected in order to immediately stop further CPU processing. The ROS clock is not stopped, thereby allowing the retry mode to be entered. In addition to the backup circuitry described, the decoder 310 sets a source data change trigger 374 whenever source data is changed no matter what function the data processing system is performing. The source data change trigger 374 is used, while attempting to retry, as a signal to branch to a restore routine after second level I-fetch.

The select mode circuitry 375 is present in the basic environmental system and is used to select whether or not the system will operate in the I/O mode or CPU mode. In the present invention, the select mode circuitry 375 also is responsive to the error detector circuitry 305 for selecting a retry mode of operation which is implemented by controlling the manner in which the words in ROSDR are decoded by decoder 310. Circuitry 375 may be merely a three way switch passing a signal via lines 380 to decoder 310. The retry mode is selected on error detection by forcing an all zero address (the address of the first word of the retry sequence) into ROAR. The all zeros address is forced by inhibiting the readout of ROSDR via inhibit line 311 which in turn forces all zeros on the return bus 315. It should be recalled that line 373 inhibited, for one CPU cycle, the CPU clock so that the F REG, M REG, and SDR inputs to ROAR are also zero which forces a retry mode address into the ROAR 308. When the retry mode is addressed, a retry sequence is read out of ROS 307 to carry out the restoration of the PSW 304, the general purpose stats 303, and the instruction address register 218. For the purposes of the present invention, these and other "houscleaning" operations may be done in a conventional well-known manner. However, when the CPU is performing functions which the retry apparatus of the present invention will not handle, the select mode circuitry 375 and additional sequential control hardware as described in the above cross-referenced related application No. 3 may be employed.

Additionally, the control circuitry of FIG. 2 may contain an error counter 392 which counts the numbers of errors detected by error detector 305. The retry sequence may use the count in error counter 392 to set up a branch to an error analysis sequence or to otherwise stop attempts at retrying the current instruction. The error counter is fed by a reset line 393 to reset the counter after each successful execution of an instruction.

Operation of the invention

With operand 1 and operand 2 located in main storage at the main storage addresses specified by B1, D1, and B2, D2, respectively, the VFL AND Op code is executed by fetching the bytes in the leftmost word of each operand field. The mover is utilized to carry out the AND routine. The results of the AND operation appear in the M register and the result bytes are transferred via the AOB to the SDR where the STORE BYTE CONTROLS 401 cause them to be stored in main storage 12. If no error occurs, then the VFL retry counter 417, after a delay sufficient to insure that no error has been detected, is incremented the number of counts equal to the number of bytes successfully stored.

Thereafter, new words from the operand fields are fetched and the processing steps continue with the VFL counter recording the number of successful byte stores every store cycle. If an error does occur, the error detector 305 via the NOT ERROR line 428 dissatisfies the AND 427 and inhibits the store byte decoder 406 from incrementing the VFL counter 417. When at least one successful store occurs, the source data change trigger 374 (see FIG. 2) is set.

When the error signal forces the address of a retry routine into the ROAR 308, the system updates the instruction address in the instruction address register 218 from the IAR backup 366. Additionally, the condition code in the PSW 304 is restored by the PSW backup 370, and the GP stats are stored by the GP stats backup 371. The GP stats backup 371 are set after each successful store of bytes into main storage. The backup stats 371 are set only after it has been determined that no error has occurred and this is implemented by the line 426 from AND 427. As previously discussed, AND 427 is not satisfied if an error occurs, and accordingly, the GP stats backup contains the status conditions in existence at the time of the last successful result store. Since the stats are used throughout VFL instruction handling they must be set to their value at the time of last successful store in order to begin processing from that point. By controlling the setting the stats with the no-error signal on line 426, the availability of the status information is assured.

After restoration, instruction fetch is carried out in the normal manner of the basic environmental system going through first and second levels. During the second level of I-fetch, the source data change trigger 374 is interrogated and since it is set in the present example, the system sequence control unit branches to a recalculate routine.

In the recalculate routine, the count in the VFL counter 417 is gated through the gating circuitry 216 to the AOB latches. The VFL count is then added to both the addresses specified by B1, D1 for operand 1 and B2, D2 for operand 2. By adding the VFL count to these values a new effective main storage address for each operand is stored in the working store and is used as the address of the first byte to be processed in retrying the instruction. Using the new effective addresses, the MB and LB counters are set to new values. After the new effective addresses have been calculated and placed in working store, the VFL retry counter count is subtracted from the L field of the instruction and the G1–G2 counter is set to its shortened value so that instruction processing can begin at the byte address just after the last successfully stored byte. Thereafter, processing proceeds in the normal manner with shortened operands.

If during the retry of the current instruction, another error is detected, the CPU clock is again inhibited, the retry sequence is addressed in the ROS, and the current instruction address is restored along with all the other backup information. First and second level I-fetch is carried out and the recalculate routine is again initiated. The instruction may be retryed as many times as desired whether a few or many bytes out of the 256 bytes are successfully processed or none are successfully processed. This ability to retry an erroneous retry attempt as many times as desired is particularly effective against relatively long bursts of errors. The error counter 392 (see FIG. 2) can be used to terminate the retry attempts. When the count in the error counter reaches N, the sequence control unit can be set to branch to an error analysis routine or to some other routine thus ending the retry attempts.

Although the invention has been disclosed in the environment of a data processing system including a central processing unit, it will of course be realized that the invention is directed to all types of data handling systems including I/O controllers as well as data communication systems.

Although the sequential control unit 302 (shown in detail in FIG. 2) of the system control unit 11 has been depicted in one preferred embodiment of the present invention as a read only store (ROS) and associated circuitry, it is clear that the sequential control unit 302 could be implemented using sequential logic circuitry.

The Op code D4 specifying the AND operation was described for the case where overlapping fields existed for operand 1 and operand 2. Operand 1 and operand 2 overlapped since the operand length, L plus 1 was 251 and the main storage addresses were 1149 and 1113, the address difference being less than 251. Since the operands did overlap, source operands were changed. If for an AND operation, the operands did not overlap, source operands would be altered, but the data would still be logically available (that is, reconstructable). Although the invention was described for overlapping fields, it of course applies to non-overlapping fields. For example, using certain Op codes with non-overlapping fields, source operands would be changed, but would not be logically available. The invention, therefore, applies equally to overlapping or non-overlapping fields and to many different Op codes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a data processing system including a control unit, a processing unit, and a storage unit, said system including error detection means, and where said system is operative to manipulate operands by fetching operand words from a field in storage to the processing unit, is operative to process said operand words a byte at a time to form changed bytes, and is operative to store said changed bytes in said field, the apparatus comprising:
   - a counter for counting the number of error-free stored bytes in said field;
   - means connected to said error detection means for inhibiting the advancement of said counter in response to an error signal;
   - means connected to said error detection means for forcing said control unit into a retry mode upon an error signal whereby a retry of the data manipulation begins with the next byte count after the count in said counter.

2. The apparatus of claim 1 further including an error counter, connected to said error detection means, for counting the number of erroneous attempts at data manipulation, said control unit being operative when said counter reaches a predetermined count N to cause said system to stop retrying said data manipulation.

3. In a data processing system including a control unit, a processing unit, and a storage unit, said system including error detection means, and where said system is operative to execute a current instruction by fetching from storage to the central processing unit operand 1 words from an operand 1 field and operand 2 words, is operative to process said operand words a byte at a time to form changed bytes, and is operative to store said changed bytes in said operand 1 field the apparatus comprising:
   - a counter for counting the number of error-free stored changed bytes;
   - means connected to said error detection means for inhibiting the advancement of said counter upon an error signal;
   - means connected to said error detection means for forcing said control unit into a retry mode upon an error signal;
   - instruction address backup store means operative in response to a signal from said control unit during said retry mode to restore the instruction address of the current instruction and thereby initiate a retry of the current instruction;
   - source data change means causing said control means to branch to a recalculate sequence whereby said current instruction is executed beginning with the next byte count after the count in said counter.

4. The apparatus of claim 3 further including an error counter, connected to said error detection means, for counting the number of erroneous attempts at executing the current instruction, said control unit being operative when said counter reaches a predetermined count N to cause said system to stop retrying said current instruction.

5. In a data processing system having a control unit including a sequence control unit, having a processing unit, and having a storage unit including a storage data register; said system including error detection means; and said system operative to process operands a byte at a time by fetching operand words from said storage data register to said processing unit and alternatively storing byte results from said processing unit to said storage unit through said storage data register under the control of store byte controls; the apparatus comprising:
   - a counter for counting the number of error-free byte results stored;
   - incrementing means connected to said store byte controls for incrementing said counter a byte count equal to the number of error-free bytes stored;

- inhibiting means connected to said error detection means for inhibiting said incrementing means in response to an error signal thereby preventing the advancement of said counter;
   - means connected to said error detection means for forcing said control unit into a retry mode in response to an error signal;
   - instruction address backup store means operative in response to a signal from said control unit during said retry mode to restore the instruction address of the current instruction thereby initiating a retry of the current instruction;
   - source data change means causing said control means to branch to a recalculate sequence whereby said current instruction is executed beginning with the next byte count after the count in said counter.

6. The apparatus of claim 5 further including an error counter, connected to said error detection means, for counting the number of erroneous attempts at executing the current instruction, said control unit being operative when said counter reaches a predetermined count N to cause said system to stop retrying said current instruction.

7. The apparatus of claim 5 wherein said inhibiting means includes delay means for delaying an incrementing signal from said sequence control means so as to enable said error detection means to develop an error signal upon occurrence of an error and thereby inhibit said incrementing signal.

8. In a data processing system having a control unit including a sequence control unit, having a processing unit, and having a storage unit including a storage data register; said system including error detection means; and said system operative to process operand words a byte at a time by fetching operand 2 words from an operand 2 field in storage and alternately fetching operand 1 words from and storing results to an operand 1 field in storage under the control of store byte controls; said operand 1 and operand 2 fields overlapping in storage; the apparatus comprising:
   - a counter for counting the number of error-free byte results stored;
   - incrementing means connected to said store byte controls for incrementing said counter a byte count equal to the number of error-free bytes stored;
   - inhibiting means connected to said error detection means for inhibiting said incrementing means in response to an error signal thereby preventing the advancement of said counter;
   - means connected to said error detection means for forcing said control unit into a retry mode in response to an error signal;
   - instruction address backup store means operative in response to a signal from said control unit during said retry mode to restore the instruction address of the current instruction thereby initiating a retry of the current instruction;
   - source data change means causing said control means to branch to a recalculate sequence whereby said current instruction is executed beginning with the next byte counter after the count in said counter.

References Cited

UNITED STATES PATENTS

| | | | |
|---|---|---|---|
| 3,426,323 | 2/1969 | Shimabukuro ______ | 340—146.1 |
| 3,452,330 | 6/1969 | Avery __________ | 340—146.1 X |
| 3,465,300 | 9/1969 | Maddox et al. ______ | 340—172.5 |

GARETH D. SHAW, Primary Examiner

P. R. WOODS, Assistant Examiner

U.S. Cl. X.R.

340—146.1